J. V. LOEFFLER.
AUXILIARY RIM AND TIRE.
APPLICATION FILED FEB. 25, 1918.
1,296,539.
Patented Mar. 4, 1919.
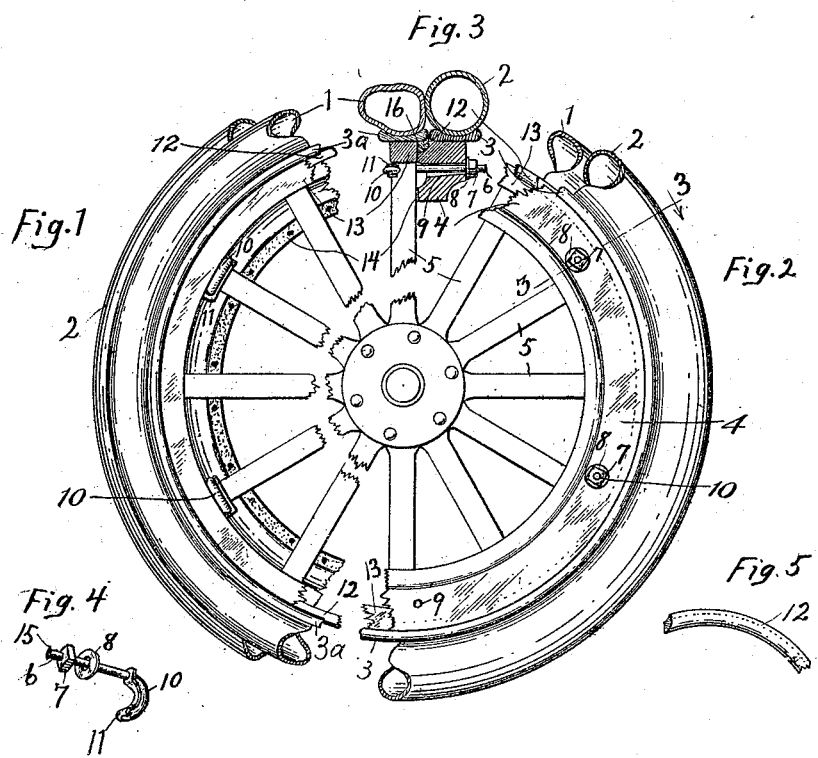
Inventor
John V. Loeffler
By Mason Fenwick Lawrence,
Attorneys

UNITED STATES PATENT OFFICE.

JOHN V. LOEFFLER, OF EVANSVILLE, INDIANA.

AUXILIARY RIM AND TIRE.

1,296,539.      Specification of Letters Patent.      Patented Mar. 4, 1919.

Application filed February 25, 1918. Serial No. 219,013.

*To all whom it may concern:*

Be it known that I, JOHN V. LOEFFLER, a citizen of the United States, residing at 1317 W. Indiana St., Evansville, in the county of Vanderburg and State of Indiana, have invented certain new and useful Improvements in Auxiliary Rims and Tires; and I do hereby declare the following to be a full, clear, and exact description of the invention, such as will enable others skilled in the art to which it appertains, to make and use the same.

This invention relates to vehicle wheels and more particularly to an auxiliary or jury felly.

Many vehicles are, at the present time, provided with various types of cushions and pneumatic or rubber tires and these are frequently badly disrupted or lacerated or so injured as to render them useless, this event frequently occurring in locations remote from convenient repair establishments, and various means have been proposed to permit the removal of the damaged tire and the substitution therefor of another and good tire, this extra tire sometimes being provided with a rim so that a rim and tire, or the tire alone, may be substituted for the rim and tire, or the tire, which has become mutilated, injured or punctured on one of the wheels of a vehicle. In the practice of substituting a tire or rim bodily for one to be removed from the wheel considerable time is lost, special tools frequently required, and the change often made under very disadvantageous circumstances even when the operator is physically capable of making the change of the extra or spare tire and removing the injured tire. In the event that the occupants or driver of the vehicle be females it is almost impossible for them to substitute the extra tire and they run the vehicle to the nearest place where assistance or change can be had, this run being made on a flat tire, which results in serious injury to a tire which may otherwise, with the exception of some small laceration, be in good condition.

It is with the object of overcoming the above noted disadvantages, of protecting the mutilated tire, of avoiding loss of time, and subjection of the vehicle organization to the strains set up when running on a flat tire, that I devised the present invention.

A further object is to provide for the ready carriage of an extra tire with its rim for the attachment with facility of the extra good tire to the wheel having a damaged tire and further it is an object to provide for the attachment of a jury felly to a standard wheel organization in such a manner that the strains on the wheel are transmitted through the jury felly to the rim attached to the wheel felly and further provide for this attachment without injuring the surface finish of the wheel structure.

A further object of the invention is to provide for a simple, practical, inexpensive and easily applied jury felly designed to carry any suitable form of tire, and a particular object of the invention is to provide a jury wheel which is adaptable, readily, to circumferentially bear upon wheel rims or other suitable elements of the wheel, the contacting elements of which may be of various sizes in a given set of wheels of the vehicle.

It is an object to provide a substantially self-contained and permanently organized jury felly and attaching means, the latter being prevented from accidental separation from the jury felly.

With the above and other objects in view, as will be manifested to those skilled in the art, the invention consists of the construction, and the combination, organization and in details as more fully hereinafter described relative to one embodiment of the invention illustrated in the accompanying drawings in which:

Figure 1 is a side elevation of one side of a portion of a wheel to which the jury felly with its tire is attached;

Fig. 2 is a side elevation of the opposite side of the wheel, showing the jury felly overlapping the spokes;

Fig. 3 is a radial section on line 3—3 of Fig. 2;

Fig. 4 is a perspective view of one of the attaching organizations, dismounted from the emergency felly;

Fig. 5 is a perspective view of a fragment of the adapting ring.

While I have shown at 2 in the drawings a form of pneumatic tire, it is obvious that this is but illustrative of any type of tire that it may be desirable to utilize and which may be similar to the partially deflated tire 1, which is mounted on the usual rim 3ª which is fastened to the usual felly 13 of a wheel of any given construction having spokes 5. The present invention, as above stated, consists essentially of a carrier or emergency felly indicated at 4 and which may be of any suitable material and construction and is in the form of a spokeless annulus upon the circumferential face of which is provided a rim 3 in which the spare or emergency tire 2 is fitted, the rim 3 being probably of duplicate character to the usual rim 3ª on a given set of wheels, so that the rims 3 and 3ª are substantially parallel and transversely alined and therefore when the emergency tire 2 is inflated it will carry the load which has been carried by the deflated or injured tire.

Any suitable or appropriate means may be employed for securing the emergency or jury felly 4 against one face of the wheel felly 13 and the spokes 5 in such a position that the felly or a portion thereon or thereof will have circumferential bearing against the projecting or overhanging shoulder indicated at 16 of the rim 3ª fastened on the wheel felly. A simple, practical, inexpensive, efficient and readily adjustable device for attaching the jury felly to the wheel structure is clearly illustrated in Fig. 4 wherein is illustrated a hook-shaped bolt 10 having a threaded portion 6, carrying a nut 7 adjacent to which is a washer 8, which latter bears against the outer face of the jury felly 4 when the bolt, which is inserted through a respective hole 9 in the felly, has its hook end fastened around the opposite face of an adjacent spoke and the nut turned up against the washer 8. Obviously, as many of the bolts 10 may be employed as desired and these will be disposed about the felly 4 as determined by the size of the wheel and the number of the spokes 5 which the hook bolts are adapted to embrace.

For the purpose of preventing damage to the finish of the spokes of the wheel suitable packing material illustrated at 11 and 14 may be introduced between the spoke contacting surface of the hooks on one side and beneath the spoke contacting surface of the felly 4 on the other.

One of the important objects of this invention is to provide for the adaptation of a given sized jury felly 4 to circumferentially bear upon the wheel rims 3ª of different size as this sometimes occurs in a set of wheels for a given vehicle and to that end, as shown in the drawings, one outer corner of the jury felly 4 is chamfered so that when the felly 4 is applied to one size of rim 3ª the latter seats snugly in the chamfered corner of the felly but when the diameter of the rims 3ª differ then an adapting ring or adapter 12 is applied to the chamfered corner of the felly 4, the adapter then bearing against the shoulder 16 of the rim when the felly is bolted on.

To prevent loss or accidental withdrawal of the bolts 10 from the felly 4, the bolts have their threaded ends 6 upset as at 15, to prevent the entire removal of the nuts 7 after the bolts have been assembled through the apertures which preferably, as shown in Fig. 3, are of tapered form, the largest end being disposed inwardly toward the spokes 5 and thereby permitting the bolts to have ample play so as to readily accommodate themselves in position on the spokes.

From the above it is to be seen that I have provided an extremely simple emergency or jury felly carrying a spare tire which organization may be quickly applied to a wheel, the tire of which may be deflated. The jury felly is of simple and substantial construction and devoid of any central organization or structural elements, being adaptable directly by means of the bolts 10 to the usual wheel structure and thereby eliminates the requirement of the attachment to the wheel organization of any extraneous fastenings and requires no alteration of the wheel and by its provision the load of the vehicle, when the emergency tire 2 is applied, is carried through means of the simple annulus 4 directly to the rim 3ª of the wheel and therefore substantially the only strain or labor imposed upon the bolts 10 is to secure the jury felly 4 from outward movement.

What is claimed as new is:

1. The combination comprising a spare felly provided with a peripheral seat for circumferential bearing upon the applied tire rim on a vehicle wheel, a rim on the felly for a tire, and hook bolts mounted in the felly to secure it to the given wheel.

2. The combination comprising a spare felly provided with a peripheral seat for circumferential bearing upon the applied pneumatic tire rim on a vehicle wheel, a rim on the felly for a tire, and means mounted on the felly to secure it to the given wheel.

3. The combination comprising a spare felly provided with a peripheral seat for circumferential bearing upon the applied tire rim on a vehicle wheel, a rim on the felly for a tire, means mounted on the felly to secure it to the given wheel, and a detachable band adapted to be mounted on the felly for adjusting it to use with a wheel rim of a different diameter.

4. A jury felly, for carrying an extra tire, comprising an annulus provided for circumferential bearing on the rim of a given wheel, a ring for adapting it to bear upon a larger rim, a tire rim attached to the annulus and means carried by said annulus to secure it to the wheel by engagement with the spokes thereof.

5. A jury felly for carrying an extra tire, comprising an annulus provided with a peripheral seat for circumferential bearing on the rim of a given wheel, a tire rim on the annulus and means on the felly to prevent injury to the wheel, said annulus having apertures to receive means to secure it to the wheel by engagement with the spokes thereof.

6. The combination with a vehicle wheel of an emergency felly with a tire rim, provided with means to detachably secure the same to said wheel, means to adapt the felly to various sizes of wheels, and means attached to a side face of the emergency felly to prevent marring of the finish of the wheel parts.

7. In combination with a motor vehicle wheel carrying a pneumatic tire, a detachable felly having a tire rim, hook-bolt members carried by the felly to engage the spokes of said wheel, one terminal of each bolt member provided with threads and enlarged, an irremovable nut on each bolt member, an adjusting ring for said felly to enable adjustment thereof to various sizes of wheels, and lining to prevent marring of the finish of the wheel structure.

In testimony whereof I affix my signature.

JOHN V. LOEFFLER.

Copies of this patent may be obtained for five cents each, by addressing the "Commissioner of Patents, Washington, D. C."